(12) United States Patent
Frollini

(10) Patent No.: US 12,380,424 B2
(45) Date of Patent: Aug. 5, 2025

(54) CONTACTLESS DEVICE AND METHOD FOR GENERATING A UNIQUE TEMPORARY CODE

(71) Applicant: Lorenzo Frollini, Montopoli di Sabina (IT)

(72) Inventor: Lorenzo Frollini, Montopoli di Sabina (IT)

( * ) Notice: Subject to any disclaimer, the term of this patent is extended or adjusted under 35 U.S.C. 154(b) by 0 days.

(21) Appl. No.: 16/471,089

(22) PCT Filed: Dec. 18, 2017

(86) PCT No.: PCT/IB2017/058041
§ 371 (c)(1),
(2) Date: Jun. 19, 2019

(87) PCT Pub. No.: WO2018/116115
PCT Pub. Date: Jun. 28, 2018

(65) Prior Publication Data
US 2019/0325427 A1    Oct. 24, 2019

(30) Foreign Application Priority Data

Dec. 19, 2016 (IT) .......................... 102016000127809

(51) Int. Cl.
*G06Q 20/32* (2012.01)
*G06Q 20/38* (2012.01)

(52) U.S. Cl.
CPC ..... *G06Q 20/3278* (2013.01); *G06Q 20/3227* (2013.01); *G06Q 20/3821* (2013.01)

(58) Field of Classification Search
CPC ............ G06Q 20/3278; G06Q 20/367; G06Q 20/3223; G06Q 20/3821; G06Q 20/3227
See application file for complete search history.

(56) References Cited

U.S. PATENT DOCUMENTS

| 8,745,405 B2 * | 6/2014 | Pizano | G06F 21/32 713/186 |
| 8,843,757 B2 * | 9/2014 | Varadarajan | G06Q 20/4012 713/168 |

(Continued)

FOREIGN PATENT DOCUMENTS

WO    WO-2014141263 A1 *    9/2014    ............... H04L 9/14

OTHER PUBLICATIONS

NIST Special Publication 800-76-2, Biometric Specifications for Personal Identity Verification, Jul. 2013, Table 7, p. 27; Table 8, p. 28 (Year: 2013).*

(Continued)

*Primary Examiner* — Calvin L Hewitt, II
*Assistant Examiner* — Steven R Chism
(74) *Attorney, Agent, or Firm* — Workman Nydegger

(57) ABSTRACT

Contactless device for electronic payment and digital recognition of a person and method for generating a unique temporary OTP dynamic code via the contactless device. The device having a first set of components and a second set of components, wherein the first set of components comprises at least one biometric sensor for detecting a biometric character of a user and generating a biometric datum; at least one battery for supplying the components of the device; a display for displaying information data; an OTP microchip for generating a temporary dynamic code; at least one activation button for the OTP token function; at least one electronic circuit for contactless communication; and a microcontroller to manage the operations of the device. The second set of components includes at least one passive NFC microchip, in which the passive NFC microchip is removable from the device and isolated from the first set of components.

7 Claims, 4 Drawing Sheets

(56) References Cited

U.S. PATENT DOCUMENTS

| | | | | |
|---|---|---|---|---|
| 9,124,433 | B2* | 9/2015 | Marien | H04L 9/3234 |
| 10,304,050 | B2* | 5/2019 | Vakklaganti | G06Q 20/352 |
| 2007/0050638 | A1* | 3/2007 | Rasti | H04L 9/3226 |
| | | | | 713/186 |
| 2008/0126260 | A1* | 5/2008 | Cox | G06Q 20/3552 |
| | | | | 705/67 |
| 2011/0126024 | A1* | 5/2011 | Beatson | H04L 9/3226 |
| | | | | 713/186 |
| 2011/0140841 | A1* | 6/2011 | Bona | G06K 19/06196 |
| | | | | 340/5.83 |
| 2011/0153437 | A1* | 6/2011 | Archer | G06Q 20/351 |
| | | | | 705/17 |
| 2011/0264919 | A1* | 10/2011 | Pizano | H04L 9/0816 |
| | | | | 713/186 |
| 2013/0092741 | A1* | 4/2013 | Loh | G06K 19/0723 |
| | | | | 235/492 |
| 2013/0144793 | A1* | 6/2013 | Royston | G06Q 20/326 |
| | | | | 705/72 |
| 2014/0224883 | A1* | 8/2014 | Aiyer | G07F 7/0806 |
| | | | | 235/492 |
| 2014/0357187 | A1* | 12/2014 | Ehrensvard | H04B 5/0031 |
| | | | | 455/41.1 |
| 2015/0118958 | A1 | 4/2015 | Jain et al. | |
| 2016/0219637 | A1* | 7/2016 | Dory | H04W 4/80 |
| 2016/0226862 | A1* | 8/2016 | Song | H04L 9/3228 |
| 2017/0303077 | A1* | 10/2017 | Li | H04B 5/0031 |
| 2017/0337542 | A1* | 11/2017 | Kim | G06Q 20/367 |
| 2018/0019994 | A1* | 1/2018 | Chang | G06F 21/32 |

OTHER PUBLICATIONS

International Standard ISO/IEC 7816-11, First edition Apr. 1, 2004-, Table 1-3, pp. 10-11 (Year: 2004).*

P. Lacharme and C. Rosenberger, "Synchronous One Time Biometrics with Pattern Based Authentication," 2016 11th International Conference on Availability, Reliability and Security (ARES), Salzburg, Austria, 2016, pp. 260-265, doi: 10.1109/ARES.2016.61. (Year: 2016).*

Written Opinion & International Search Report for PCT/IB2017/058041 dated Mar. 13, 2018, 10 pages.

* cited by examiner

CONTACTLESS DEVICE AND METHOD FOR GENERATING A UNIQUE TEMPORARY CODE

TECHNICAL FIELD

The present invention relates to a device for payment transactions with "Contactless" technology (NFC), a function of "Token OTP", with recognition through a biometric sensor, for example, a fingerprint. The present device can be integrated into several types of physical support such as bracelets, key rings, pendants and so on.

STATE OF THE ART

The "Contactless" payment, i.e. without any contact, has recently become a more and more widespread method of payment. The devices used for this type of payment can be, for example, credit cards. These work by applying radiofrequency identification (RFID) technology. For example, unlike a traditional card that is equipped with a magnetic strip or a microchip, a contactless card does not require to be physically inserted into a card-reader. In fact, it is sufficient to approach the reader itself.

The advantage of this type of card is that the payment takes place more quickly. For example, for payments under a certain amount (generally 15-25 euros) the transaction is carried out offline, i.e. without typing the pin or signing the receipt and in a few moments.

Another important aspect is that this type of payment has laid the groundwork for Near Field Communication (NFC) applications. In this case, it is possible to provide for the association of an NFC-enabled telephone, that is with a built-in read/write RFID system, or any other device (for example tablets and smartphones) that allows to perform electronic money transactions or access specific services.

To guarantee the security of this type of electronic payment, the payment device usually uses dedicated passwords. For example, an OTP (One-Time Password) is used that is valid for a single login session or transaction only. The main advantages of using an OTP is that, opposite to the traditional static password, it is not vulnerable to the so-called replication attacks. This means that if a potential intruder can intercept an OTP that has already been used to access a service or execute a transaction, the intruder will not be able to reuse it, as it will no longer be valid. On the other hand, one cannot memorize an OTP. Therefore, it requires additional technology to be used.

However, the contactless payment systems currently used are very often linked to third-party services (for example, a telephone company or software-house in the case of payment via smartphone) thus leading to a reduction in IT security. Furthermore, these systems are not always easy to use for people who are not used to such technologies, such as elders.

Therefore, it is an object of the present invention to provide a contactless device, a system and a usage method that overcome the aforementioned drawbacks.

SUMMARY OF THE INVENTION

These objects are achieved by a device, by systems, by a fixed support and by methods according to the claims at the end of the present description.

The contactless device for electronic payment and digital recognition of a person according to the present invention comprises a first set of components and a second set of components.

The first set of components comprises at least one biometric sensor for detecting a biometric character of a user and generating biometric data, at least one battery to supply power the components of the device, a display for displaying information data intended as data output, an OTP microchip for generating a temporary dynamic code, at least one activation button for the OTP token function, at least one electronic circuit for contactless communication, and a microcontroller for managing device operations. The microcontroller is connected to the biometric sensor, to the electronic circuit, to the battery, to the display medium, to the OTP microchip, to the activation button and to the electronic circuit.

The second set of components includes at least one passive NFC microchip, in which the passive NFC microchip is removable from the device and physically isolated from the first set of components.

In this way, a safer device is guaranteed compared to those currently on the market as it prevents third parties, external to the management system (for example the banking system or that of the Public Administration), from accessing the services provided and therefore from sharing the encryption/decryption keys and sensitive information of the holder.

According to an aspect of the invention, the device is devoid of any component for mobile network connection, such as GSM, GPRS, 3G, LTE or similar.

In particular, the device provides greater security at an IT level since it is free of external access with respect to the use, for example, of a smartphone or the like. In fact, a smartphone connected to a mobile network, and therefore to the internet, can be subject to security flaws due to malware or viruses installed unknowingly by the user through applications (App) or received emails.

According to another aspect of the invention, the biometric sensor comprises a reader for detecting the fingerprint of the holder.

Therefore, access services and even password generation can occur without the user manually entering a pin. Furthermore, security is guaranteed with respect to any third parties who intend to use the device illegally. Advantageously, the biometric sensor can include other types of detectors, such as a face recognition detector, voice recognition, etc.

The physical support according to the present invention can take the form of a bracelet, a key ring, a pendant or the like, and comprises the aforementioned device.

In this way, anyone can conduct the payment or the service in an easy and quick way, without having to take out a card or activate a mobile phone. Moreover, it avoids having to remember a pin to input since the detection of the biometric data of the holder will be sufficient.

The electronic payment system according to the present invention comprises at least one of the above-mentioned devices, a point of sale terminal for receiving data from and sending data to the device, a payment circuit for receiving data from and sending data to the point of sale terminal and an authentication and control server to receive data from and send data to the payment circuit.

In particular, the device is configured to receive and send data exclusively through the point of sale terminal, wherein the biometric data is stored both in the device and in the authentication and control server.

Unlike the devices currently on the market enabled for contactless electronic payment, such as smartphones, in which the biometric data is stored exclusively in the device and not elsewhere, in the device according to the present invention the storage of the biometric data takes place at the device delivery, after an adequate verification of the holder by the personnel in charge of this function, ensuring that the device is associated only with the holder. In this way, the biometric data is stored and used also in the authentication and control server.

In this way, the exclusive use of the device by the holder is guaranteed. On the contrary, on a device such as a smartphone, it is possible to store and use a fingerprint different from that of the credit card holder, no longer guaranteeing a secure use.

The digital recognition system of a person according to the present invention comprises at least one of the above-mentioned devices, an NFC terminal for nearby communication to receive data from and send data to the device, an administration server for receiving data from and sending data to the NFC terminal and an authentication and control server to receive data from and send data to the administration server.

In particular, the device is configured to receive and send data exclusively through the NFC terminal, wherein the biometric data is stored both in the device and in the authentication and control server.

In an advantageous way, the biometric data is stored and used also in the authentication and control server.

The system for managing a bank account and for requesting an authorization for a banking operation according to the present invention includes at least one device mentioned above, a server of a banking system for receiving data from the device, and an authentication and control server to receive data from and send data to the banking system server.

In particular, the device is configured to receive and send data exclusively through the banking system server, in which the biometric data is stored both in the device and in the authentication and control server.

In an advantageous way, the biometric data is stored and used also in the authentication and control server.

The method for generating a single temporary OTP dynamic code through a contactless device according to the present invention includes the authentication of a user by detecting a biometric character of the user by means of a biometric sensor present in the device, the activation of an OTP microchip to generate a temporary dynamic code which is present inside said contactless device following said authentication and the calculation and generation of the valid and unique OTP temporary dynamic code by means of an algorithm generated by the OTP microchip.

According to an aspect of the invention, the method further comprises the generation of a text string resulting from the detection of the user's biometric character through the biometric sensor, the integration of said text string within the algorithm through the OTP microchip and the calculation and generation of the valid and unique temporary OTP dynamic code.

In particular, the text string is used as one of the keys for the calculation of the temporary OTP dynamic code, without which the temporary OTP dynamic code cannot be generated.

The method for an electronic payment by means of a contactless device according to the present invention includes sending to the device by a point of sale terminal an authorization request to a payment, the authentication of a user through the detection of a biometric character of the user by means of a biometric sensor present in the device, the generation of a single OTP temporary dynamic code according to the method described above, the submission of the temporary single OTP dynamic code by the contactless device to the point of sale terminal via close communication, sending the temporary OTP dynamic code from the point of sale terminal to an authentication and control server through a payment circuit and sending the result of the payment request to the contactless device by the authentication and control server by means of payment circuit and point of sale terminal.

In particular, according to this method, the text string used to generate the unique temporary OTP dynamic code is stored both in the device and in the authentication and control server.

The method for digital recognition of a person by means of a contactless device according to the present invention includes sending to the device an authentication request from a user who is the holder of the device following an authorization request to consult a user personal document, the user authentication through the detection of a biometric character thereof through a biometric sensor present in the device, the generation of a single temporary OTP dynamic code according to the method described above, the submission of the single temporary OTP dynamic code from the contactless device to an NFC for proximity communication, sending the single temporary OTP dynamic code from the NFC to an authentication and control server via an administration server, wherein the administration server includes data related to the user's personal document, the submission of the result of the authorization request to consult the document to the contactless device by the authentication and control server through the administration server and the NFC terminal.

In particular, according to this method, the text string used to generate the unique temporary OTP dynamic code is stored both in the device and in the authentication and control server.

According to one aspect of the invention, at least one pre-installed code relating to the type of the requested personal document of the user is used as one of the keys for the calculation of the temporary OTP dynamic code.

According to a further aspect of the invention, the pre-installed code is stored both in the device and in the administration server, and in the authentication and control server.

The device is part of the range of possibilities to make payment systems transactions as an alternative to debit cards, credit cards, bracelets, key rings, mobile phones "smartphones", and other solutions. Through the internal OTP Token, it releases the OTP code to the holder of the banking report for the allowed use. The authentication system deployed in the device is based on a biometric recognition system, for example, a fingerprint.

It is an autonomous device that allows payment quickly and securely, which generates, when necessary, a code visible from a low-consumption OLED screen, and activated by a fingerprint reader. It allows greater convenience and speed in daily payments without having to take out the debit/credit card from the cash wallet or the mobile phone from the pocket. Through the NFC technology, it is sufficient to bring the device close to a common POS (Point of Sale) and carry out the transaction. Thanks to the fingerprint reader, the biometric sensor does not need the direct use of a PIN for the payment of amounts exceeding a maximum amount per transaction established by the Payment Circuit (currently €25 per transaction), ensuring the most complete security against fraud and cloning. In addition, the device may be used to access home banking or other needs requiring an OTP prior to user authentication. By appropriate agreements with the Public Administration and local authorities, the bank will be able to guarantee the identity of the person, thanks to the proper verification carried out at their branches, and through the device will be able to provide the services of digital recognition (Identity Card, Sanitary/Fiscal Code Card, National Charter of Services, SPID, Driving License, Passport and Digital Signature, etc.), as well as the provision of season tickets for national and local public transport.

The use of the device will allow for a lower need for cash, thanks to its simplicity of operation, even for elderly people, less inclined to use debit and credit cards for daily payments. It will provide greater security for the person relating to assaults for robbery and fraud.

The advantage of this device is that it has no external access with respect to the use of a smartphone for similar services, which will always be dependent on a software-house or a third-party company, decreasing the security in terms of information technology and personal data processing. In addition, the battery in a smartphone can be discharged and force the user to return to traditional payment methods, while this device having a low power consumption is placed in a sphere of new efficient and safe devices that will replace the systems currently in use. Leaving the management of the utilizing system completely to the bank/ distributor and to payment circuits. So, enabling the services of the new device can only be authorized by the distributor.

These and other aspects of the present invention will become more apparent form the point of view of the following description of some preferred embodiments described below.

DETAILED DESCRIPTION OF THE INVENTION

Figure 1:
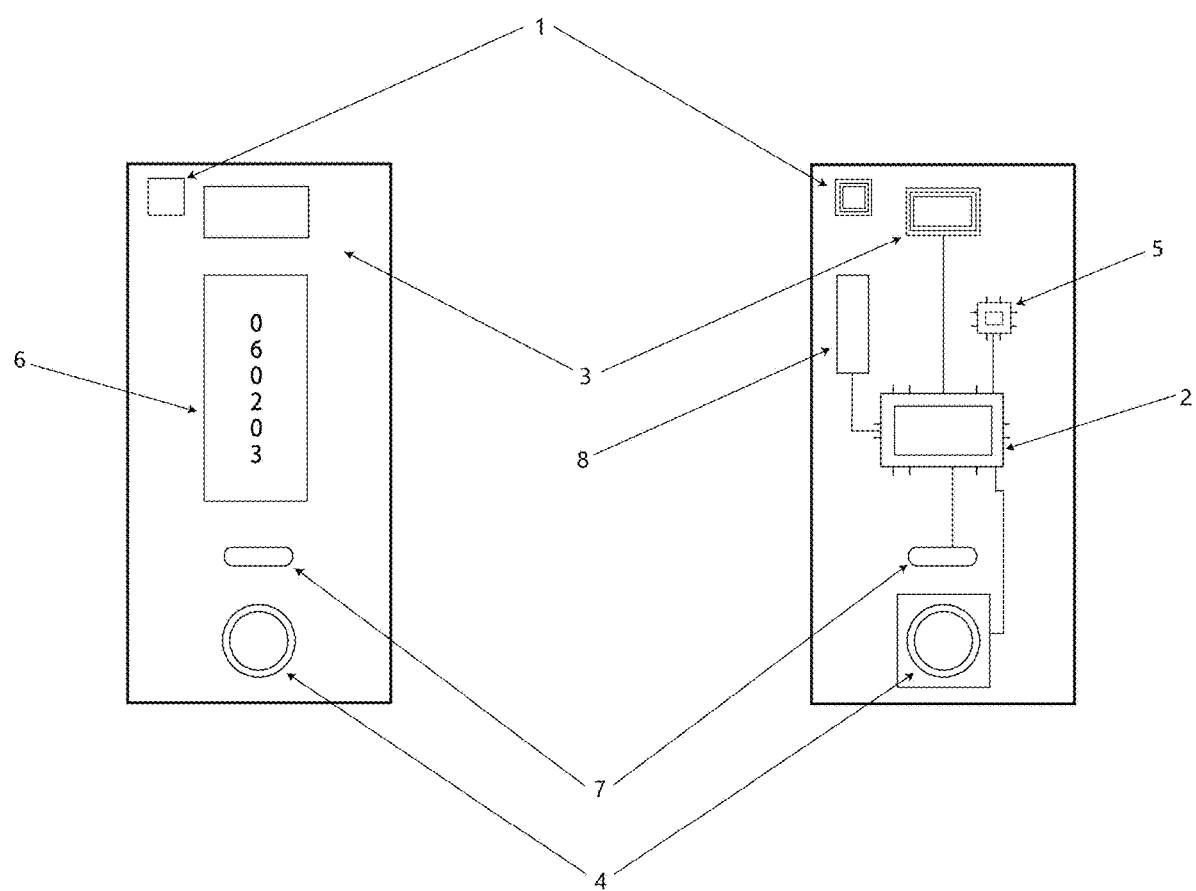
FIG. 1 shows a schematic representation of the device according to an aspect of the present invention seen from the outside (left) and from the inside (right)

As shown in FIG. 1, the device may consist of an NFC microchip 1 which is inserted in a special seat and can be easily removed, by a microcontroller (MCU) 2 which manages all the incoming and outgoing operations. Note that these two are not connected to each other. To guarantee total security of operations, only the microcontroller can be connected to the following components:
  microchip for Contactless communication (NFC) 3;
  biometric sensor 4, for example a fingerprint reader;
  OTP 5 microchip to generate a temporary dynamic code;
  display 6, for example OLED for output;
  activation button 7 for the OTP Token function;
  battery 8 that provides power.

Figure 2:
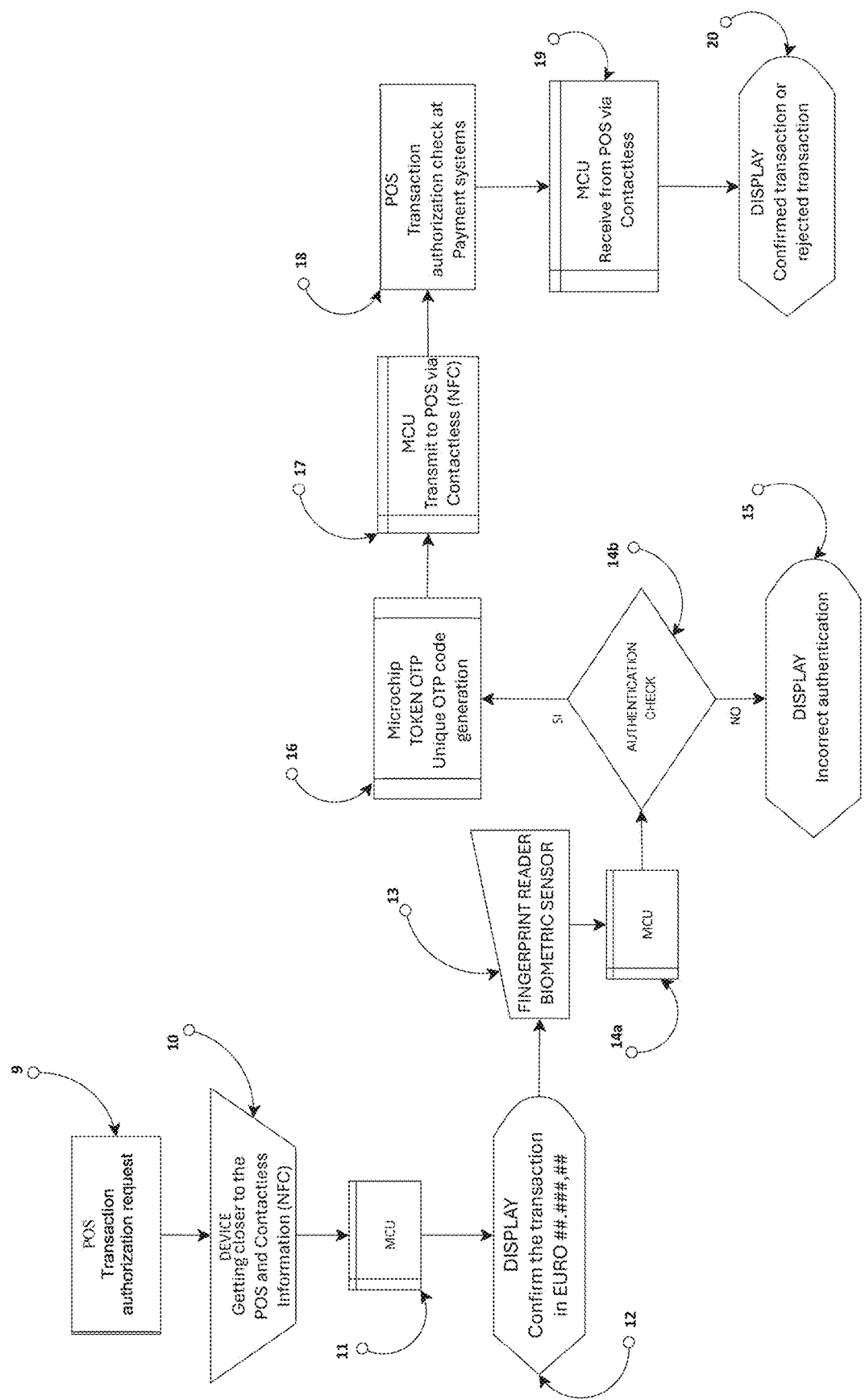
FIG. 2 shows in a flowchart the method for an electronic payment via a contactless device according to an aspect of the invention.

FIG. 2 shows schematically the payment process of the contactless device via NFC.

At the time of payment, the shopkeeper will activate the payment request on the POS (Point Of Sale) terminal 9. Payment authorization is done by bringing the device close to the POS and the payment request will be transmitted via the "Contactless" protocol (NFC) 10. The microcontroller will receive the request 11 and will activate the OLED display requesting confirmation of the transaction through the fingerprint reader biometric sensor 12. The validation of the user will take place through the aforementioned sensor 13 which will generate a "template" text string. The string will be sent to the microcontroller which will check its correctness 14a and 14b. If not, the incorrect authentication will be returned to the display 15. In the positive case, the "template" text string will pass to the OTP microchip that will integrate it into its own algorithm for the calculation of the unique OTP code and without which the code will be unusable 16. The microcontroller will receive the unique OTP code 17, which in turn will transmit it to the POS through the microchip for the "Contactless" communication (NFC) and then will send it to the payment circuit for verification 18. Finally, the microcontroller will receive confirmation of the executed/rejected transaction 19 and will show it on the display of the device 20.

Figure 3:
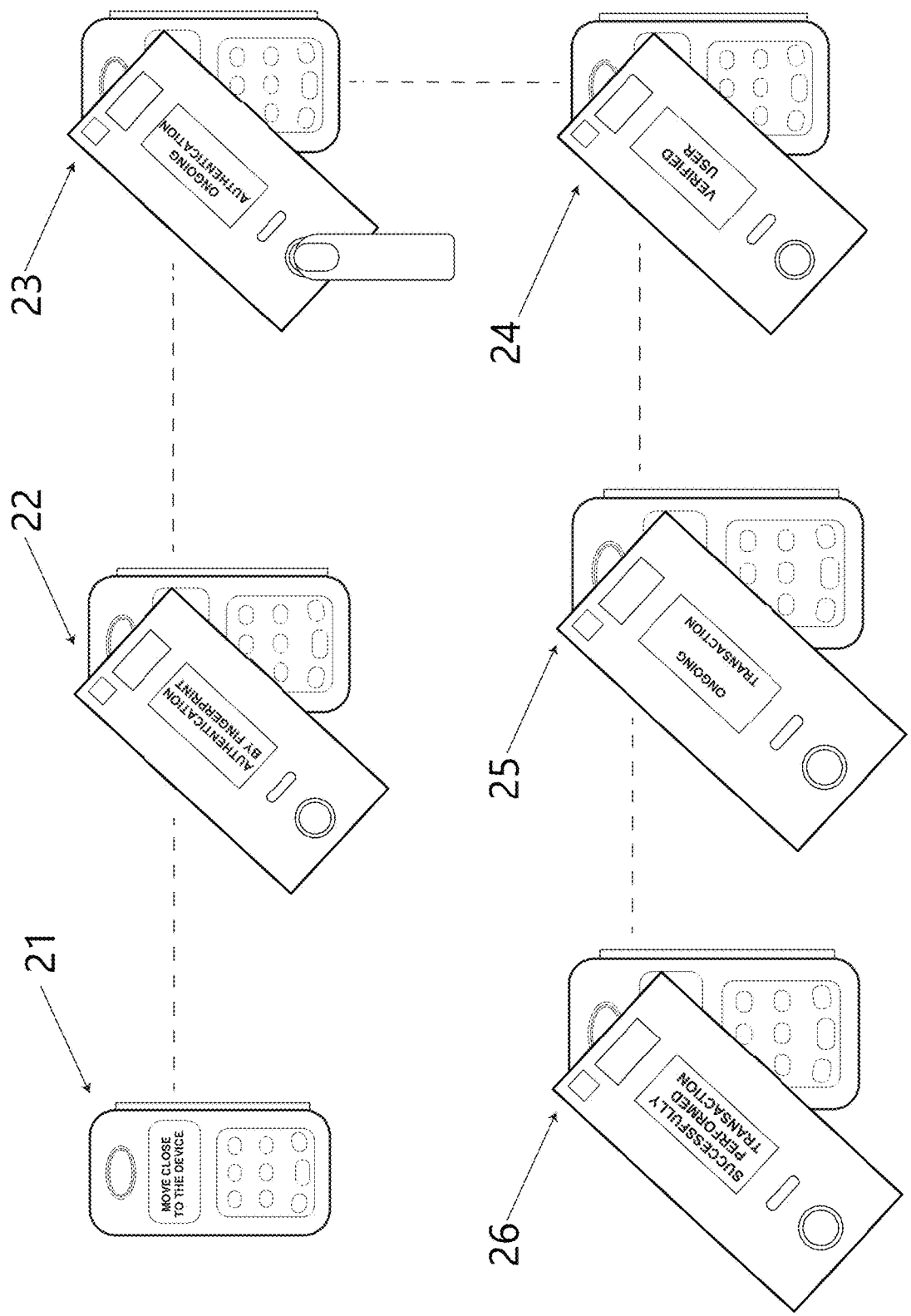
FIG. 3 shows in a schematic representation the mode of use of the contactless device according to an aspect of the invention.

FIG. 3 shows a graphic explanation of the modes of use of the device. In particular, the use includes the following steps:
  payment request from the POS terminal 21;
  bringing the device close to the POS and user request of authentication 22;
  authentication of the device holder through the biometric sensor, for example the fingerprint reader 23;
  confirmation of the authentication on the display of the device 24;
  transaction in progress through Contactless technology (NFC) 25;
  confirmation of the occurred transaction 26.

Figure 4:
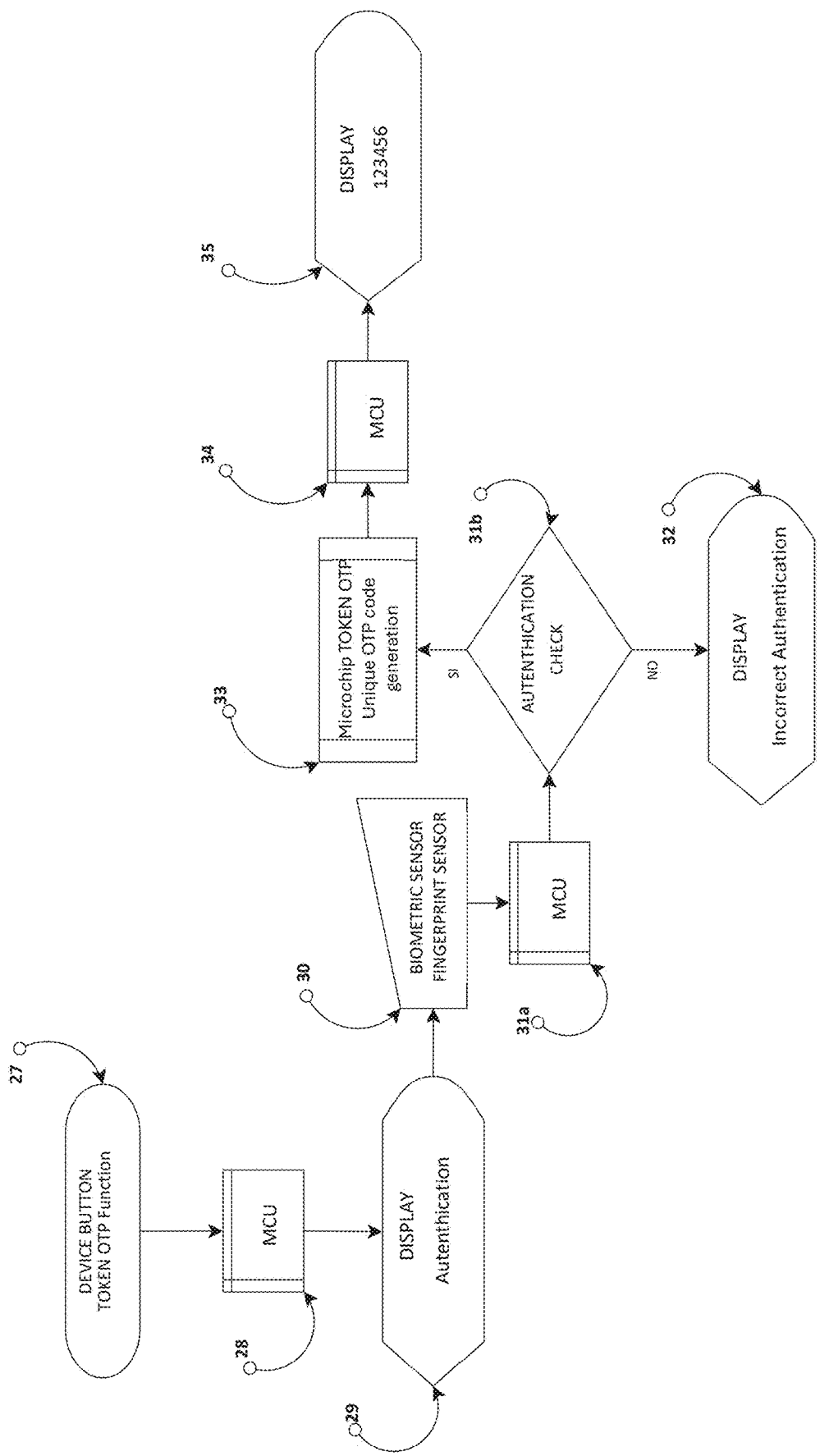
FIG. 4 shows in a flowchart the method for generating and using a temporary OTP dynamic code.

FIG. 4 shows the method for generating and using a temporary OTP dynamic code, in particular the "Process for the function of OTP Tokens for access to home banking or other needs requiring an OTP".

In case of need to access a service requesting an OTP code, the user will press on the activation button for the OTP Token 27 function. The microcontroller will process the request 28 and will send a message on the display, for example an OLED display, requesting authentication of the device holder through the biometric sensor, for example, the fingerprint reader 30. The validation of the user will take place through the aforementioned sensor 30 which will generate a "template" text string. The verification by the microcontroller 31a and 31b will then take place. If not, the incorrect authentication 32 will be returned to the display, in the positive case the "template" text string will be shown on the OTP microchip which will integrate it into its own algorithm. The microchip will in turn generate a single OTP code 33. Once said single OTP code has been generated, it will send it back to the microcontroller 34, which will have it shown on the display of the device 35.

As to the process of assigning the device to the holder, at the time of opening a bank account, the bank will verify the customer adequately. Upon delivery of the device to be assigned, the fingerprint scan will be performed using a biometric reading sensor integrated into a special device available to the banking operator. This scan will provide a "template" text string, from which it is not possible to reconstruct the original imprint. This will be stored in the database of the bank/distributor of the service and will be integrated into the OTP algorithm of the device to be assigned.

Once the identification of the device has been registered in the procedure, for the activation, it will be necessary for the holder to proceed to the first reading of his fingerprint through the fingerprint reader biometric sensor, having obtained the correct detection will generate the text string "template" and will be stored inside the device. Once the "template" text string is obtained, it will be used by the OTP microchip which will integrate it into its own algorithm. The OTP microchip will in turn generate a unique OTP code which will be passed to the microcontroller, which will show it on the device display. The holder will inform the operator that he will check if it is formally correct through the bank/distributor information system. Alternatively, the operator can activate the request for a fictitious or null payment and the nominee must authorize through the payment process of a contactless device via NFC described above.

As to the process for the provision of digital recognition services (Identity Card, Health Card/Tax Code, National Service Card, SPID, Driving License, Passport, Digital Signature, etc.), the Public Administration (PA) will conduct, through its own channels, the digitization of the personal documents of the user (Identity Card, Health Card/Fiscal Code, National Service Card, SPID, Driving License, Passport, Digital Signature, etc.). Through the registry system of the Public Administration, the "template" text string of the document holder, previously acquired at the time of release at the PA offices, will be codified thanks to a special biometric fingerprint reader. Once the "template" text string is obtained, it will be used in a search key of the document with an algorithm that will also contain the number of the document itself. In this way, it will be possible for a user of the service, by previous agreement to exchange algorithms for the search, to query the archive with the scan of the fingerprint together with the insertion of the document number on a dedicated web-service platform. Thus, having the privacy protection of personal data guaranteed as it is accessible only with the consent of the document holder.

When a bank account is opened, the bank will verify the customer, by connecting to the web-service platform of the public administration system. The operator at the desk will ask the customer for the consensus to interrogate his/her document(s) on the PA registry system to scan the fingerprint through the biometric reading sensor integrated in a special device available to the bank operator. Then through the "template" text string obtained, and inserting the document number to be verified, the operator will be able to conduct the appropriate verification of the customer. Subsequently, in order to provide the digital recognition service through the device to be assigned, a unique identification code will be assigned for each type of document, already stored in the microcontroller of the device and will be communicated by the operator to the PA registry system. The result will be an encoding algorithm of the documents, consisting of the "template" text string for the fingerprint and the unique code for the document.

Thanks to agreements previously made between the users of the digital recognition service, it will be possible, through appropriate terminals with Contactless technology (NFC) and/or connected to a PC, for the applicant to verify the identity of the holder of the device, with the return of personal and specific data for document type, as well as the image of the document itself provided by the digital recognition service system. The consent to the inquiry of the requested documents takes place by approaching the device to the terminal, the latter will transmit the request through the "Contactless" protocol (NFC), the microcontroller will receive the request and activate the OLED display requesting authentication of the device holder via the biometric sensor, for example, a fingerprint. Once the user has been validated, the microcontroller will provide the identification codes of the documents requested to the OTP microchip, which will integrate them into its own algorithm, generating a temporary OTP dynamic code. The code will then be transmitted to the terminal via the microchip for "Contactless (NFC)" communication. Finally, the terminal will show the result of the inquiry.

OTP dynamic code. The code will then be transmitted to the terminal via the microchip for "Contactless (NFC)" communication. Finally, the terminal will show the result of the enquiry.

This type of service will be useful to further protect the shopkeepers who want to carry out a further check on the identity of the customer.

As to an alternative payment process via "Contactless" (NFC) and the relative assignment of the device, payment can be made with a different type of OTP algorithm for the payment of a transaction in progress. Take the biometric sensor, for example, the fingerprint reader will read the fingerprint of the holder, exclusively used to access the device. Once the user is verified, the microcontroller will proceed with the activation of the OTP microchip which will generate a unique OTP code for the transaction in progress. Finally, the generated OTP code will be transmitted to the POS through the microchip for Contactless communication (NFC).

The difference with the OTP algorithm previously described in the payment process by a contactless device via NFC, consists in the structure of the algorithm itself. In the first case, the "template" text string obtained, for example through the biometric scan of the holder's fingerprint is an integral part of the algorithm. In the second case (alternative), the algorithm is only generated by the OTP microchip, to generate a temporary dynamic code, as the "template" text string is used exclusively to allow the MCU microcontroller to activate the above-mentioned OTP microchip to generate a temporary dynamic code.

Upon opening a bank account, the bank will verify the customer, will proceed to the association of the device and each type of customer document with unique pre-installed codes in the microcontroller, which will be loaded on a dedicated web-service platform in agreements with and protected by the registry system of the Public Administration. Upon delivery of the device, with the support of the operator, the holder will proceed to the permanent storage of the fingerprint inside the device.

Users of the digital recognition service can interrogate the device through appropriate terminals with Contactless technology (NFC) and/or connected to a PC as described previously in the process of assigning the device to the holder. Similarly, the alternative process can also be used for the digital recognition service.

As to the process for the provision of season tickets for national and local public transport, the subscription can be activated directly at the bank desk or by home banking. The bank will take care of activating the subscription service for the users of the service, subject to the stipulated agreement providing the identification code of the microchip to be activated.

Below, the components and the functionalities of the device as well as of the elements of the systems above described are reported in detail, according to various aspects of the present invention.

Device (or First Device)

The device can be integrated into various types of wearable supports, such as bracelets, key rings, pendants, watch straps, etc.

The device may comprise the following items:
biometric sensor 4, for example of digital fingerprint;
display 6;
circuitry (voltage regulators, signal amplifiers, printed circuit, wired and/or wireless charging circuit, etc.);
battery 8;
one or more input buttons 7;
microprocessor(s) microcontroller(s) 2 for firmware/software of the device;
OTP 5 microchip to generate a temporary dynamic code;
integrated circuit for Contactless NFC communication, if a microprocessor(s) or microcontroller(s) already preset to NFC 3 technology is not used;
antenna for contactless NFC communication; and
one or more removable "passive NFC TAG(s)" 1 and isolated from the rest of the components to ensure the safety of the device, prepared for generic NFC services (national and/or local public transport pass, gyms, etc.).

The functions of this device can be summarized below:

User authentication through the detection of a biometric character, for example by scanning the fingerprint through the appropriate sensor from which the biometric template for the fingerprint is generated and which will be compared with the one(s) stored in the device;

Enrollment or "Registration of the device holder" by means of the acquisition and storage of one or more fingerprints of the holder of the device, generation and storage of the related biometric templates;

Calculation of the Temporary Dynamic Code (One Time Password, OTP) for each payment or recognition transaction, according to current or future cryptographic standards, wherein the encryption/decryption keys are or may be:
  i. timestamp (relating to date and time),
  ii. biometric template, that is the alphanumeric text string resulting from the fingerprint scan,
  iii. Alternatively or in combination with point ii, the use of a biometric template resulting from other biometric sources, such as iris, face physiognomy, etc.
  iv. shared key between the device and the Authentication and Control Server (defined later),
  v. information concerning the holder of the device and the transaction in progress, and/or
  vi. codes which are pre-installed in the device to be associated with each type of document of the holder of the device at the time of delivery of said device for the digital recognition of the person service;

Contactless NFC communication for data communication from and to the outside through the integrated circuit for NFC contactless communication and NFC contactless communication antenna;

user interface via Display and Input Buttons;

contactless NFC payment. During the payment, at the POS Terminal, the device receives the request for payment authorization. The display shows the Owner's authentication request through the fingerprint sensor. The fingerprint sensor acquires the fingerprint of the holder. If the holder is validated, the device uses the biometric template resulting from the scan of the fingerprint as one of the keys for the calculation of the temporary OTP dynamic code. The device calculates the temporary OTP dynamic code and transmits the temporary OTP dynamic code via Contactless NFC to the POS terminal. The device receives the result of the payment from the POS terminal via Contactless NFC communication, showing it on the display. According to an alternative aspect of the device of the present invention, the payment can occur without the use of the biometric template as a key to the calculation of the temporary OTP code;

OTP Tokens for Home-Banking. This function can be performed according to the following steps:
  i. the holder will press on the activation button for the OTP Token function,
  ii. the authentication request of the device holder through the biometric sensor, for example, the fingerprint reader, is shown on the display,
  iii. the fingerprint sensor acquires the fingerprint of the holder,
  iv. if the holder is validated, the device uses the biometric template resulting from the scan of the fingerprint as one of the keys for the calculation of the temporary OTP dynamic code,
  v. the device calculates the temporary OTP dynamic code,
  vi. The device shows the temporary OTP dynamic code on the display,
  vii. if not, the incorrect authentication will be returned to the display;

Digital recognition of the person. This function can be performed according to the following steps:
  i. at the time of the inquiry request of the document by the public official or his guardian, at the dedicated NFC terminal receives the authorization request to the inquiry,
  ii. the display shows the owner's authentication request through the biometric sensor, for example, a fingerprint reader,
  iii. the fingerprint sensor acquires the fingerprint of the holder,
  iv. if the holder is validated, the device uses the biometric template resulting from the scan of the fingerprint as one of the keys for the calculation of the temporary OTP dynamic code,
  v. the device uses the pre-installed code related to the type of requested document as one of the keys for the calculation of the Temporary OTP dynamic code,
  vi. the device calculates the temporary OTP dynamic code,
  vii. The device transmits the temporary OTP dynamic code via Contactless NFC to the dedicated NFC terminal,
  viii. the device receives the result of the inquiry from the NFC dedicated terminal via Contactless NFC communication, showing it on the display;

generic NFC services, such as season tickets for national and/or local public transport, gyms, etc.). By reading the passive NFC TAG associated with one of the generic NFC Services, the device allows access to the aforementioned services. Note that the authorization or renewal of the aforesaid services, subject to agreement with the providers of the same, can be done directly through the Home Banking services.

Second Device

In addition to the above-described device, which can be defined as the "first device", a "second device" can be provided, wherein the second device can be used for assigning the first device.

The second device may comprise the following items:
- fingerprint sensor;
- circuitry (voltage regulators, signal amplifiers, printed circuit, cabled or wireless PC connection with wired and/or wireless charging circuit, etc.); and
- microprocessor(s) or microcontroller(s) for the second device firmware/software.

The functions of this second device can be summarized below:
- connection via software and hardware interface between the second device and PC connected to the banking system or the Public Administration for the delivery phase of the first device; and
- Enrollment or Registration of the holder of the first device within the banking system or the Public Administration. This feature comprises:
  i. acquisition and storage of one or more fingerprints of the holder of the first device,
  ii. generation and storage of the related biometric templates, and
  iii. submission of the acquired data to the Authentication and Control Server.

Operator Interface PC for Assigning the First Device

The functions of this interface can be summarized below:
- connection via software and hardware interface between the second device and PC connected to the banking system for the enrollment step;
- enrollment or registration of the holder of the first device within the banking system. This function provides the following steps:
  i. registration of the identifier of the first device,
  ii. acquisition of biometric data through the second device,
  iii. submission of the biometric data acquired from the second device to the Authentication and Control Server, and
  iv. verification of the correct assignment of the first device by inserting the first temporary OTP dynamic code supplied by the first device.

Operator Interface PC for Enabling the Personal Digital Recognition Service

The functions of this interface can be summarized below:
- connection via software and hardware interface between the second device and PC connected to the Public Administration system (server of Authentication and Control of the Public Administration version, server of the Public Administration) for the Enrollment step;
- Enrollment or Registration of the holder of the first device within the system of the Public Administration. This function provides the following steps:
  i. registration of the identifier of the first device on the server of the Public Administration,
  ii. acquisition of biometric data through the second device,
  iii. submission of the biometric data acquired from the second device to the Authentication and Control server, and
  iv. association of the codes which are pre-installed in the first device to each type of document allowed within the server of the Public Administration and of the Authentication and Control server.

Authentication and Control Server (Version Dedicated to the Banking System and Version Dedicated to the Public Administration)

This server includes the following features and functionalities:
- software and hardware interface with the PC connected to the second device for the step of enrollment or registration of the holder of the first device within the banking system or the Public Administration. Reception of biometric data acquired from the second device and storage (storage) of the same;
- this server features codes which are pre-installed in the first device associated with each type of document of the holder;
- software and hardware interface with the payment circuit for the Contactless NFC payment, in the version for the banking system;
- software and hardware interface with the web-service platform for Home Banking, in the version for the banking system;
- software and hardware interface with the Public Administration Server (defined later), in the version for the Public Administration;
- for both versions, the user authentication through the calculation of the temporary dynamic code (One Time Password, OTP) for each payment or recognition transaction, according to current or future cryptographic standards, wherein the encryption/decryption keys are or may be:
  i. timestamp (relating to date and time),
  ii. biometric template, that is the alphanumeric text string resulting, for example, from the fingerprint scan,
  iii. alternatively to point ii, the payment can occur without the use of the biometric template as a key to the calculation of the temporary OTP code,
  iv. shared key between the first device and the Authentication and Control Server,
  v. information concerning the holder of the first device and the transaction in progress,
  vi. pre-installed codes in the first device associated with each type of document of the holder, for the version for the Public Administration;
- comparison of the code received from the payment circuit or from the Home Banking web services platform, in the version for the Banking System;
- submission of the result to the payment circuit or to the Home Banking web-service platform, in the version for the Banking System;
- comparison of the code received from the server of the Public Administration, in the version for the Public Administration; and
- submission of the result to the Public Administration server, in the version for the Public Administration.

Point of Sale (POS) Terminal or Point of Sale

The functions of this interface can be summarized below:
- submission to the first device, via Contactless NFC, of the authorization request of payment to the payment circuit;
- reception of feedback data from the first device ("unauthenticated holder" or "temporary OTP dynamic code" or "data missing by mistake in the Contactless NFC communication")
- if the holder is authenticated, the POS terminal transmits the authorization request of the transaction and the temporary dynamic OTP code to the payment circuit;

the terminal receives the result of the transaction authorization from the payment circuit and shows it on the display;

if the holder is not authenticated, the POS terminal shows on the display and prints a message of failed transaction;

submission to the first device via "Contactless" NFC of the result of the authorization of the transaction.

Payment Circuit

The functions of this circuit can be summarized below:

reception of the temporary OTP dynamic code from the POS terminal;

submission of the temporary OTP dynamic code to the Authentication and Control server (Bank System version);

reception of the result on the verification of the authentication of the holder from the Authentication and Control server;

if the result is positive, execution of routine checks to authorize the transaction (for example, balance verification, availability, etc.);

submission of the result on the transaction authorization to the POS terminal;

if not, submission of the result on the transaction authorization to the POS terminal;

Home Banking Server

The functions of this server can be summarized below:

interface for managing/consulting bank accounts;

reception of the temporary OTP dynamic code from the web interface generated on the first device;

submission of the temporary OTP dynamic code to the Authentication and Control server;

reception of the result on the verification of the authentication of the holder from the Authentication and Control server;

if the result is positive, it allows access to the Home Banking services;

if not, it does not allow access to the Home Banking services;

in case of authorization request of an operation, the server foresees the following operations:
  i. reception of the temporary OTP dynamic code from the web interface generated on the first device,
  ii. submission of the temporary OTP dynamic code to the Authentication and Control server,
  iii. reception of the result on the verification of the authentication of the holder from the Authentication and Control server,
  iv. if the result is positive, it allows the authorization for the operation,
  v. if not, it does not allow the authorization for the operation.

NFC Terminal Dedicated to the Digital Recognition Service of the Person

This terminal may comprise the following items:

display;

circuitry (voltage regulators, signal amplifiers, printed circuit, wired and/or wireless charging circuit, etc.);

wired or wireless connection with the Public Administration server;

battery;

one or more input buttons;

microprocessor(s) or microcontroller(s) for firmware/software;

integrated circuit for Contactless NFC communication, if a microprocessor(s) or microcontroller(s) already preset to NFC technology is not used; and antenna for "Contactless" NFC communication.

The functions of this terminal can be summarized below:

submission to the first device, via Contactless NFC, of the authorization request for consulting the required document;

reception of feedback data from the first device ("unauthenticated holder" or "temporary OTP dynamic code" or "data missing by mistake in the Contactless NFC communication")

if the holder is authenticated, the NFC sends the authorization request for consulting the document and the temporary OTP dynamic code to the Public Administration server;

the terminal receives and shows the result of the inquiry;

if the holder is not authenticated, the terminal shows a message of failed inquiry;

submission to the first device, via Contactless NFC, of the result of the authorization request for consulting the required document;

Public Administration Server

The functions of this server can be summarized below:

communication with the Authentication and Control server (Public Administration version);

possession of personal data, data and images of the documents of the holder;

possession of codes which are pre-installed in the first device associated with each type of document of the holder;

it provides a step of enabling the digital personal identification service, where the codes which are pre-installed in the first device are associated with each type of document of the holder, communicated through the software and hardware interface between the second device and the PC connected to the Public Administration system;

communication with an NFC terminal dedicated to the digital recognition service of the person for the request of access to the personal digital recognition service, reception of the temporary OTP dynamic code from the dedicated NFC terminal;

submission of the temporary OTP dynamic code to the Authentication and Control server (Public Administration version);

reception of the result on the verification of the authentication of the holder from the Authentication and Control server;

if the result is positive, submission of the data related to the requested document to the NFC terminal;

if the result is negative, submission of a message of failed enquiry to the NFC terminal.

A person skilled in the art can perform several and further modifications and variants to the device, the system and the method described above, in order to satisfy further and contingent needs, all said modifications and variants however included within the scope of protection of the present invention as defined by the appended claims.

The invention claimed is:

1. A method performed by a contactless device comprising a microcontroller, a biometric sensor, a One Time Password (OTP) microchip, an activation button, a display, and a Near Field Communication (NFC) chip, the method comprising: storing, by the microcontroller, a text string;
  at a first time, authenticating a user, the authenticating the user comprising:
    detecting, by the biometric sensor, biometric data of the first user by a biometric scan;

generating, by the biometric sensor, a first text string from the biometric data and generating, by the biometric sensor, a biometric template from the text string; determining, by the microcontroller, that the first text string and the text string are the same;

based on the first text string and the text string being the same, generating, by the OTP microchip, and based on the first text string, a first OTP code; and sending, by the NFC chip, the generated first OTP code to a second device over an NFC protocol; and at a second time different from the first time, determining, by the microcontroller, actuation of the activation button by the user;

displaying, by the microcontroller, a request for authentication in the display;

detecting, by the biometric sensor, biometric data of the user by a biometric scan;

generating, by the biometric sensor, a second text string from the biometric data and generating, by the biometric sensor, a biometric template from the second text string;

determining, by the microcontroller, that the second text string and the text string are the same;

based on the second text string and the text string being the same, generating, by the OTP microchip, and based on the second text string, a second OTP code; and displaying, by the microcontroller, the second OTP code in the display.

2. The method according to claim 1, the method further comprising: storing, by the OTP microchip, a plurality of keys wherein the first text string is generated utilizing a key of the plurality of keys.

3. The method according to claim 1, wherein the contactless device further comprises a passive NFC microchip that is physically separate from the biometric sensor, the OTP microchip, the NFC chip, or the microcontroller.

4. The method according to claim 3, wherein the passive NFC microchip is removable from the contactless device.

5. A contactless device for authenticating a user, comprising:
   an activation button;
   a display; and
   a controlling means for:
      storing a text string;
      determining a first text string and the text string are the same;
      determining activation of the activation button by the user;
      displaying, based on the determined activation, a request for authentication in the display;
      determining, that a second text string generated based on determining the determined activation and the text string are the same;
      displaying a One Time Password (OTP) code on the display after determining, that a second text string generated based on determining the determined activation and the text string are the same;
   a biometric means for:
      detecting biometric data of the user by a biometric scan;
      generating a first text string from the biometric data and generating a first biometric template from the text string;
      based on the determined actuation, detecting, by a biometric scan, biometric data of the user;
      generating a second text string from the biometric data based on the determined activation and generating a second biometric template from the second text string;
   an OTP means for:
      based on a first text string and the text string being the same, and based on the first text string, a first OTP code;
      based on the second text string generated based on determining the determined activation and the text string are the same, generating a second OTP code;
   a Near Field Communication (NFC) means for:
      sending the generated first OTP code to a second device over an NFC protocol.

6. The contactless device according to claim 5, further comprising a passive NFC means that is physically isolated from the biometric sensing means, the OTP means, the NFC means, or the controlling means.

7. The contactless device according to claim 6, wherein the passive NFC means is removable from the contactless device.

* * * * *